United States Patent Office 3,123,637
Patented Mar. 3, 1964

3,123,637
PROCESS FOR REDUCING THE TENDENCY OF CRYSTALLINE UREA TO CAKE
Edwin W. Lard, Richard C. Horn, and Howard Donovan Green, all of Memphis, Tenn., assignors to W. R. Grace & Co., New York, N.Y., a corporation of Connecticut
No Drawing. Filed Nov. 24, 1961, Ser. No. 154,829
7 Claims. (Cl. 260—555)

This invention relates to the treatment of crystalline urea and to the product thereby produced. More particularly this invention relates to crystalline urea having greatly reduced caking properties and to a process for preparing the same.

It is a well-known fact that many organic and inorganic salts and compounds in powdered, crystalline or granular form have a great tendency to cake and form more or less rigid solid masses when stored for any significant period of time. The ultimate consumer therefore usually must crush or otherwise break up these masses before they can be used for their intended purpose. As an example, the caking tendencies of various fertilizer materials necessitate the expenditure of much labor and time in order to render these materials suitable for even distribution in the area to be fertilized and also to avoid or substantially eliminate clogging and jamming of the distribution machinery. Crystalline urea is particularly susceptible to the difficulties mentioned.

Crystalline urea is commercially available in a variety of forms, ranging from long needlelike crystals to rectangular or square-shaped crystals of relatively large size. In the usual plant operations, crystalline urea is dried to a low moisture content (less than about 0.2% by weight) and packaged in multi-ply bags having moisture barriers such as polyethylene film plies or asphalt laminate plies. Regardless of the particular shape and form of the crystals that are dried and packaged in this manner, it is always found that the mass of crystals tends to set up into a single solid cake when stored in the ordinary manner. In some instances, particularly with the needlelike crystals, a hard solid cake is formed in a matter of hours when the bagged urea is subjected to very slight pressures, on the order of 1 to 5 pounds per square inch.

Various methods have been proposed for avoiding the caking problems noted above. One prior proposal has been to completely melt the crystalline urea followed by spraying air into a small stream of the molten mass to form small uniform pellets. Other proposals involve addition of various so-called "anti-caking" agents. It has also been proposed to granulate or agglomerate crystalline urea by adding thereto a binding agent such as chalk or starch and then moistening and agitating the crystalline mass. All of these prior proposals have one or more disadvantages, for example: introduction of impurities into the urea; requirement for expensive and time consuming process steps and equipment; or production of weak and readily disintegratable pellets or agglomerates.

It is an object of this invention to provide a process for treating crystalline urea in order to reduce its tendency to cake. It is a further object of this invention to provide crystalline urea having a substantially reduced tendency to cake. It is still another object of this invention to provide a process for preparing substantially non-caking crystalline urea without the necessity of adding impurities thereto. Other objects of this invention will be apparent to those skilled in the art in view of the more detailed disclosure which follows.

This invention is based upon the discovery that the storage caking tendency of urea crystals is greatly reduced by passing the crystals through a high temperature zone maintained at a temperature greater than about the melting point of urea (about 275° Fahrenheit), withdrawing the crystals from said high temperature zone before they become completely fused, and recovering the heat-treated crystals after they have cooled to a temperature below about 210° Fahrenheit. The substantially non-caking crystalline urea produced by this process is useful in any of the applications where crystalline urea is ordinarily used. It is particularly suitable for use in fertilizer applications, where its substantially non-caking characteristics are of especial importance.

The actual temperature of the high temperature zone through which the urea crystals are passed is not critical. Thus the high temperature zone may comprise an externally heated furnace, a simple flame front, or any other suitably heated zone. In any case, it is necessary that substantially all of the individual crystals be exposed to the zone of high temperature. This can be accomplished in a wide variety of ways, for example: agitating a mass of crystals in a heated furnace; permitting a dispersed stream of crystals to fall through a high temperature flame; conveying a mass of crystals in a bed substantially one crystal thick past a radiant heater, under a flame, or through a heated furnace; or the like.

In accordance with the invention, the urea crystals are exposed to the zone of high temperature for a time insufficient to completely melt the individual crystals. No specific time range can be stated since time depends upon the particular mode of treatment. Where the temperature of the high temperature zone is very high (e.g., where the zone is a flame front) and the crystals are passed through this zone as a dispersed stream, significant improvements in anti-caking properties are obtained almost instantaneously, that is, with a single pass through the high temperature zone. Where a large mass of crystals is treated in, e.g., a rotary furnace, longer exposure times (on the order of 0.2 to about 1.5 hours) are required before substantially all of the individual crystals can be exposed. In all cases it is required that the urea crystals be withdrawn from the high temperature zone before complete fusion of the mass occurs. In some instances incipient fusion of the surface of some individual crystals may occur and occasionally some agglomeration results from contact of temporarily softened crystals. Improvements in anti-caking properties are obtained regardless of these occasional effects of the high temperature treatment.

The urea crystals are recovered from the high temperature treatment zone after cooling to a temperature below about 210° Fahrenheit. At temperatures higher than this, undue agglomeration of the heat treated crystals into a large body may occur. In some instances, as, e.g., where urea crystals are dropped through a flame front or a vertically disposed heated furnace, the mass temperature of the treated crystals is well below the limiting temperature noted above, and the crystals may be immediately packaged in the ordinary manner. When a mass of crystals is fed through, e.g., a heated rotating horizontal furnace, the mass temperature of the crystals may be as high as about 250° to 270° Fahrenheit. In this case, it is necessary to remove the heat source and continue to agitate the heat-treated crystals until the mass temperature is below about 210° Fahrenheit before the crystals can be covered and packaged. Heat-treated crystalline urea with mass temperatures of up to about 200 to 205° Fahrenheit has been packaged and stored without any noticeable decrease in the anti-caking properties which result from the process of this invention.

As indicated above numerous means can be used for carrying out the process of this invention. Urea crystals can be placed on an endless conveyer belt which passes through a high temperature furnace or past a source of radiant heat. Anti-caking crystalline urea has been obtained by gravity feeding a stream of urea crystals through a vertical tubular furnace and by dropping urea crystals through a tube having a Bunsen type flame front maintained at the discharge end. We have also obtained substantially anticaking urea crystals by feeding a mass of crystals to a rotary mixing drum, introducing a flame into the center of the drum, rotating the drum to lift the crystals and drop them through the flame, removing the flame after substantially all the individual crystals have been exposed thereto, and cooling and recovering the heat-treated crystals. Instead of a rotating drum various other devices such as ribbon blenders, paddle mixers, cement mixers or the like can be used. It is also feasible to indirectly heat the interior of the mixing device rather than introducing a flame into the interior.

The process of this invention can be conducted in a batch-wise or continuous manner, as desired. Obviously, the gravity feed apparatus and the endless belt conveyor discussed above are each readily adapted to continuous operation. A continuous process using a rotating horizontal mixer is shown in one of the specific examples which follow. These specific examples are intended to be illustrative only, and should not be construed as limiting the invention other than as defined in the appended claims.

*Example 1*

The neck of a 500-milliliter round bottom flask having a hole about 1½ inches in diameter in the bottom was attached to a rotary vaporizer so as to hold the flask in a horizontal position. About 100 grams of dry crystalline urea was placed in the flask and the flask was then rotated at about 56 revolutions per minute. An ignited Bunsen burner was placed in the hole at the bottom of the flask and a vacuum drawn through the rotary vaporizer to pull the flame into the flask and allow it to play on the surface of the tumbling pile of crystals. When the mass of agitating crystals reached a moist, sticky condition (as determined by visual observation) the flame was withdrawn from the flask. Rotation was continued until the heat-treated crystals had cooled to room temperature.

About 100 grams of the treated crystalline urea was placed in a 1½-inch inside diameter metal cylinder and sufficient weight placed thereon to create a pressure of about 2 pounds per square inch. This pressure is approximately the same as that encountered under ordinary warehouse conditions, being about the same as the estimated pressure on the bottom bag in a three pallet stack. A sample of untreated urea crystals was placed in a second cylinder and weighted in the same manner. After seven days at ambient temperature the test samples were removed from the cylinders and the degree of caking was determined by measuring the weight in kilograms, applied through a ⅜-inch diameter rod, required to break any cake or lumps formed. The sample of treated urea crystals required only 0.4 kilogram whereas the cake formed by testing the untreated crystals broke only after a weight of 4.5 kilograms had been applied.

*Example 2*

About 200 grams of urea crystals were charged to a one-gallon can which was then placed on a ball mill and rotated. After the contents of the can had been heated to about 120° centigrade, a hot air blast was directed into the tumbling crystals through a hole in the top of the can until the surface of the crystals was incipiently fused. The hot air blast was then discontinued and the crystals cooled to room temperature while continuing to rotate the can.

A sample of the treated crystals remained free flowing after standing for several days in a glass jar.

*Example 3*

One hundred pounds of crystalline urea were placed in a horizontal rotating drum cement mixer. The flame from a large gas jet burner was directed into the discharge opening of the rotating drum in such a manner as to permit the crystals lifted by the flights of the drum to drop through the flame. This treatment was continued for about 30 minutes after which the flame was withdrawn and the crystals cooled to room temperature while continuing to rotate the mixer.

The cooled product was packaged in the conventional manner in a standard multiwall paper bag closed with a tape-over-sewing closure. This bag, together with another bag of the same type containing untreated urea crystals, was placed on a pallet. Two loaded pallets of bagged urea crystals were then placed on top of the test bags in accordance with standard warehousing procedure.

Examination of the test bags after they had remained in the warehouse for seven days showed that the treated urea crystals remained essentially free flowing and contained only a few soft lumps. The weight required to break these lumps when tested for degree of caking by applying a weight thereto through a ⅜-inch diameter rod as described in Example 1 was about 0.5 kilogram. In contrast it was found that the untreated urea crystals had set to a hard solid mass inside the bag and that samples taken therefrom required about 10 kilograms to break when tested in the same manner.

*Example 4*

A tubular furnace 12 inches long and having an inside diameter of 1¼ inches was vertically mounted at a height about 7 feet above a product collection area. The furnace was indirectly heated to a temperature of about 600° Fahrenheit measured by a thermocouple inserted into the furnace at about the mid point of its length. A small stream of urea crystals was fed at ambient temperature to the top of the furnace from whence it fell by gravity through the furnace and then through the ambient atmosphere to a collection pile about 6 feet below the discharge end of the furnace. The mass temperature of the collected product crystals was only slightly higher than the temperature of the crystals fed to the high-temperature zone.

When tested for caking tendency by the test method described in Example 1, the weight required to break the cake formed from the heat treated crystals of this example was only 0.4 kilogram.

*Example 5*

A metal tube about 2 feet long was vertically mounted about 7 feet above a product collection area. A mixture of air and heating gas normally used in laboratory Bunsen burners was passed through the tube and ignited to form a flame front at the lower end of the tube. A stream of urea crystals was fed to the top of the tube and carried by the gas stream and the force of gravity through the tube and flame front. The heat treated urea crystals then fell through the ambient atmosphere to a collection pile about 6 feet below the flame. The mass temperature of the collected product crystals was again only slightly higher than room temperature. These heat treated crystals had improved anti-caking properties as good as crystals produced in the examples above.

*Example 6*

Crystalline urea was continuously fed at a rate of 280 pounds per hour into a tilted horizontal cylinder 12 feet long and 1.5 feet in diameter which was rotating at about 10 revolutions per minute. The flame from a large gas jet burner was directed into the discharge end of the cylinder into direct contact with the urea crystals. The heat treated crystals developed a moist sticky appearance and had a measured mass temperature of about 272° Fahrenheit. These crystals were continuously withdrawn from the heated zone after an average residence time therein of about 7 minutes, and fed to another rotating cylinder where they cooled to about 120° Fahrenheit before bagging.

Bags of treated and untreated urea crystals were tested for caking properties by the warehouse stacking method described in Example 3 above. After seven days in the warehouse it was found that the bag of treated urea was essentially free flowing and contained only a few soft lumps (totalling 4 pounds) which could be broken by applying weights of 1½ kilograms or less. The untreated urea crystals had set up into a solid mass in the bag and samples from it required about 18 kilograms before they would break.

Thus it has been shown that the process of this invention is a rapid and inexpensive mode of substantially reducing the caking tendency of crystalline urea. Any of the various forms of crystalline urea can be effectively treated in accordance with the teachings herein. When the process is performed in heated rotating cylinders or other similar apparatus requiring longer exposure times the moisture content of the urea crystals to be treated should be less than about 3 percent. When apparatus is used wherein substantially all of the individual crystals are exposed to very high temperature zones for very short times (e.g., by passing through a flame front) the moisture content of the urea crystals may be as much as 5 percent or more. In the latter mode of performing the process not only will the caking tendencies of the urea crystals be reduced, but the crystals will also be simultaneously dried.

What is claimed is:

1. Process for the treatment of pure dry crystalline urea which comprises passing said crystals through a high temperature zone heated to a temperature greater than the melting point of urea, until the crystal surfaces are incipiently fused as indicated by their sticky condition, withdrawing the crystals from said zone before they are completely fused, and recovering the heat-treated crystals after they have cooled to a temperature below about 210° Fahrenheit.

2. Process for the treatment of pure dry crystalline urea which comprises charging said crystals to a rotatable horizontal container, rotating said container to agitate said crystals, establishing a high-temperature zone in said container heated to a temperature greater than the melting point of urea, passing substantially all of the agitated crystals through said high temperature zone whereby the crystal surfaces are incipiently fused as indicated by their sticky condition, removing said high temperature zone, continuing to agitate said crystals until they cool to a temperature below about 210° Fahrenheit, and recovering the cooled crystals.

3. Process for reducing the storage caking tendency of pure dry crystalline urea which comprises charging said crystals into a rotatable container, rotating said container to agitate said crystals, directing a flame into the center of said rotating container, continuing said rotation until substantially all individual crystals have passed through said flame whereby the crystal surfaces are incipiently fused as indicated by their sticky condition, withdrawing the flame from the container and cooling the crystals to room temperature while continuing to agitate the same.

4. Process for reducing the storage caking tendency of pure dry crystalline urea which comprises establishing a high-temperature flame front having a temperature greater than the melting point of urea, passing a stream of said crystalline urea through said flame front whereby the crystal surfaces are incipiently fused as indicated by their sticky condition, cooling said heat-treated urea to a temperature below about 210° Fahrenheit and recovering the cooled crystals.

5. Continuous process for reducing the caking tendency of pure dry crystalline urea which comprises forming a layer of said crystalline urea substantially one crystal thick on a conveyor, continuously conveying said layer of crystals through a high temperature zone heated to a temperature greater than the melting point of urea whereby the crystal surfaces are incipiently fused as indicated by their sticky condition, withdrawing said crystals from said high-temperature zone before they are completely fused, cooling said crystals to a temperature below about 210° Fahrenheit, and continuously recovering said cooled crystals.

6. Continuous process for reducing the caking tendency of pure dry crystalline urea which comprises continuously feeding a mass of said crystalline urea into a first agitating device, agitating the crystals, directing a flame into said device and in contact with said mass of crystals, retaining said mass of agitated crystals in said device until substantially all individual crystals have contacted said flame whereby the crystal surfaces are incipiently fused as indicated by their sticky condition, continuously withdrawing the mass of crystals from said first agitating device before they are completely fused and transferring them to a second agitating device, and continuing to agitate said crystals in said second device until they are cooled to a temperature below about 210° Fahrenheit.

7. Continuous process for reducing the caking tendency of pure dry crystalline urea which comprises continuously feeding said crystalline urea into a first agitating device, agitating said crystals, directing a flame into said device and in contact with said mass of crystals, retaining said mass of agitated crystals in said device until substantially all individual crystals have contacted said flame whereby the crystal surfaces are incipiently fused as indicated by their sticky condition, continuously withdrawing the mass of crystals from said first agitating device before they are completely fused and transferring them to a second agitating device, continuing to agitate said crystals in said second device while cooling them to ambient temperatures, and recovering the cooled crystals.

References Cited in the file of this patent

UNITED STATES PATENTS 2,327,333     Kirkpatrick  ----------- Aug. 17, 1943

UNITED STATES PATENT OFFICE
CERTIFICATE OF CORRECTION

Patent No. 3,123,637 March 3, 1964

Edwin W. Lard et al.

It is hereby certified that error appears in the above numbered patent requiring correction and that the said Letters Patent should read as corrected below.

Column 2, line 61, for "covered" read -- recovered --; line 69, for "endles" read -- endless --.

Signed and sealed this 8th day of September 1964.

(SEAL)
Attest:

ERNEST W. SWIDER
Attesting Officer

EDWARD J. BRENNER
Commissioner of Patents